United States Patent [19]

Geyer et al.

[11] Patent Number: 5,702,069
[45] Date of Patent: Dec. 30, 1997

[54] UNLOCKABLE CONNECTION DEVICE

[75] Inventors: Freddy Geyer, Tanneron; Gérard Vezain, Mandelieu; Christian Roux, Grasse, all of France

[73] Assignee: Aerospatiale Societe Nationale Industrielle, France

[21] Appl. No.: 520,848

[22] Filed: Aug. 30, 1995

[30] Foreign Application Priority Data

Aug. 30, 1994 [FR] France ................... 94 10423

[51] Int. Cl.$^6$ .................. B64D 1/12; B64G 1/64
[52] U.S. Cl. .................. 244/161; 244/158 R; 244/137.4; 403/348; 403/349
[58] Field of Search .................. 244/137.1, 137.4, 244/158 R, 161; 294/82.26, 82.29; 403/348, 349

[56] References Cited

U.S. PATENT DOCUMENTS 3,045,779  7/1962  Rosenthal .
3,196,745  7/1965  Sustrich et al. .
4,625,619  12/1986  Ceniza ..................... 244/158 R X
5,002,418  3/1991  McCown et al. ............ 403/349 X
5,261,758  11/1993  Vranish ..................... 403/348
5,271,286  12/1993  Vranish ..................... 244/161 X
5,406,876  4/1995  Harless et al. .............. 244/137.4 X

FOREIGN PATENT DOCUMENTS 2661466  10/1991  France .
2685399  6/1993  France .

*Primary Examiner*—William Grant
*Attorney, Agent, or Firm*—Hayes, Soloway, Hennessey, Grossman & Hage, P.C.

[57] ABSTRACT

A device for the unlockable connection between two objects such as a satellite and a spacecraft incorporating a rotary key connection. The unlocking connection is made by the rotation of a ring carrying the key. This rotation is induced by the axial displacement of a rod carrying the ring and controlled by a spring. This spring is released by an initiating system, such as a pyrotechnic or similar system.

10 Claims, 2 Drawing Sheets

UNLOCKABLE CONNECTION DEVICE

BACKGROUND OF THE INVENTION

1. Field of the Invention

The present invention relates to a connection device which can be rapidly unlocked and which is intended to connect two objects, and more particularly, to a connection device that creates a minimum disturbance of the attitude and relative velocity of the objects at the instant of their separation. A preferred application of such a device is in the launching and placing in position of objects such as satellites, probes, etc. from a spacecraft such as a launcher, planetary probe, etc.

2. Description of Related Art

FR-A-2 661 466 and U.S. Pat. No. 3,196,745 each depict a connection device wherein two objects which are to be separated from one another are linked by means of a segmented nut and maintained in engagement on one or more threaded parts by a locking ring normally surrounding said nut. When actuated, unlocking initiating means, usually of a pyrotechnic nature, axially displace the ring with respect to the segmented nut. The nut is then separated from the threaded part so that the connection between the two objects is unlocked.

This type of unlockable connection device generally gives satisfactory results. However, due to the excessive and totally uncontrolled nature of the energy dissipated by the unlocking initiating means (i.e., pyrotechnic means), the attitude and velocity transmitted to the ejected object are consequently very difficult to control. In addition, the male threaded part is ejected with the object.

Other prior art connecting devices suffer from a drawback in that the unlocking, controlled by pyrotechnic means, leads to the breaking of a part. Like the preceding devices, these devices induce a shock when they are actuated. Moreover, they are not suitable for the ejection of an object having a significant mass at a low velocity. Thus, the part, whose breaking is controlled by the pyrotechnic means, must be dimensioned so as to withstand the significant forces which it undergoes at the time of launch. The energy released by the pyrotechnic means must allow the breaking of said part and the bringing up to the necessary velocity of the object, which is not possible in all cases. Further disadvantageously, in this type of connecting device a foreign body is ejected with the object.

The present invention solves the aforementioned drawbacks by providing an unlockable connection device in which the pyrotechnic shock is not applied directly in the area where the separation occurs, so that the forces applied between the objects are limited and known to provide precise control of the attitude and velocity of the released object. Furthermore, the present invention provides a device which provides the above-mentioned irrespective of the mass or weight of the object to be ejected and in which the ejection of the object is not accompanied by the ejection of a foreign body.

SUMMARY OF THE INVENTION

Accordingly, the present invention provides an unlockable connection device for use between two objects comprising a first member fixed to the first of said objects, a second member connected to the second object, unlockable coupling means to engage said first and second members, said second object having coupling means comprising a rotary key system, unlocking initiating means and an unlockable blocking mechanism to immobilize the second member with respect to the second object, and wherein unlocking of said first and second members is controlled by the unlocking initiating means and by a displacement of the second member in a given direction with respect to the second object.

Preferably, an elastic means is provided to displace the second member in said given direction.

In this arrangement, unlocking initiating means act on the unlockable blocking mechanism. The second member is then released and displaced at a velocity controlled by the calibrated force exerted by the elastic means. This controlled velocity makes it possible to guarantee the unlocking of the key by rotation prior to the actual ejection taking place due to the inertia of the object to be ejected. This leads to a rotation of the key system and a precisely controlled unlocking of the unlockable coupling means, which previously coupled the two objects. The unlocking by rotation and the action of the unlocking initiating means make it possible to control the attitude of the released object and also its velocity.

In a preferred embodiment of the invention, the second member incorporates a rod, this rod has one end thereof removeably fixed to the second object by the unlockable blocking mechanism. The determined direction is then oriented in accordance with the axis of the rod on moving away from the second object.

In this preferred embodiment, the rod supports a rotary ring carrying at least one key normally bearing against one face of the first member in a first angular position of the ring with respect to said first member. This key is able to traverse a notch formed in said face, in a second angular position of the ring with respect to the first member. Means are provided for controlling a rotation of the ring from the first to the second angular position when the rod moves in the predetermined direction.

Advantageously, the means for controlling a rotation of the ring comprise at least one pin-groove assembly interposed between the ring and a part connected to the second object.

Preferably, this part can be fixed to the second object and can support the unlocking initiating means. It can also be an annular ejector piston movable in the predetermined direction with respect to the second object.

The unlockable blocking mechanism can incorporate a segmented nut in removable engagement on a threaded portion of the second member and bearing against an abutment surface connected to the second object. A sleeve normally encircles said segmented nut so as to be axially displaceable with respect to the segmented nut during an actuation of the unlocking initiating means.

It will be appreciated by those skilled in the art that although the following Detailed Description will proceed with reference being made to preferred embodiments, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF PREFERRED EMBODIMENTS

Figure 1:
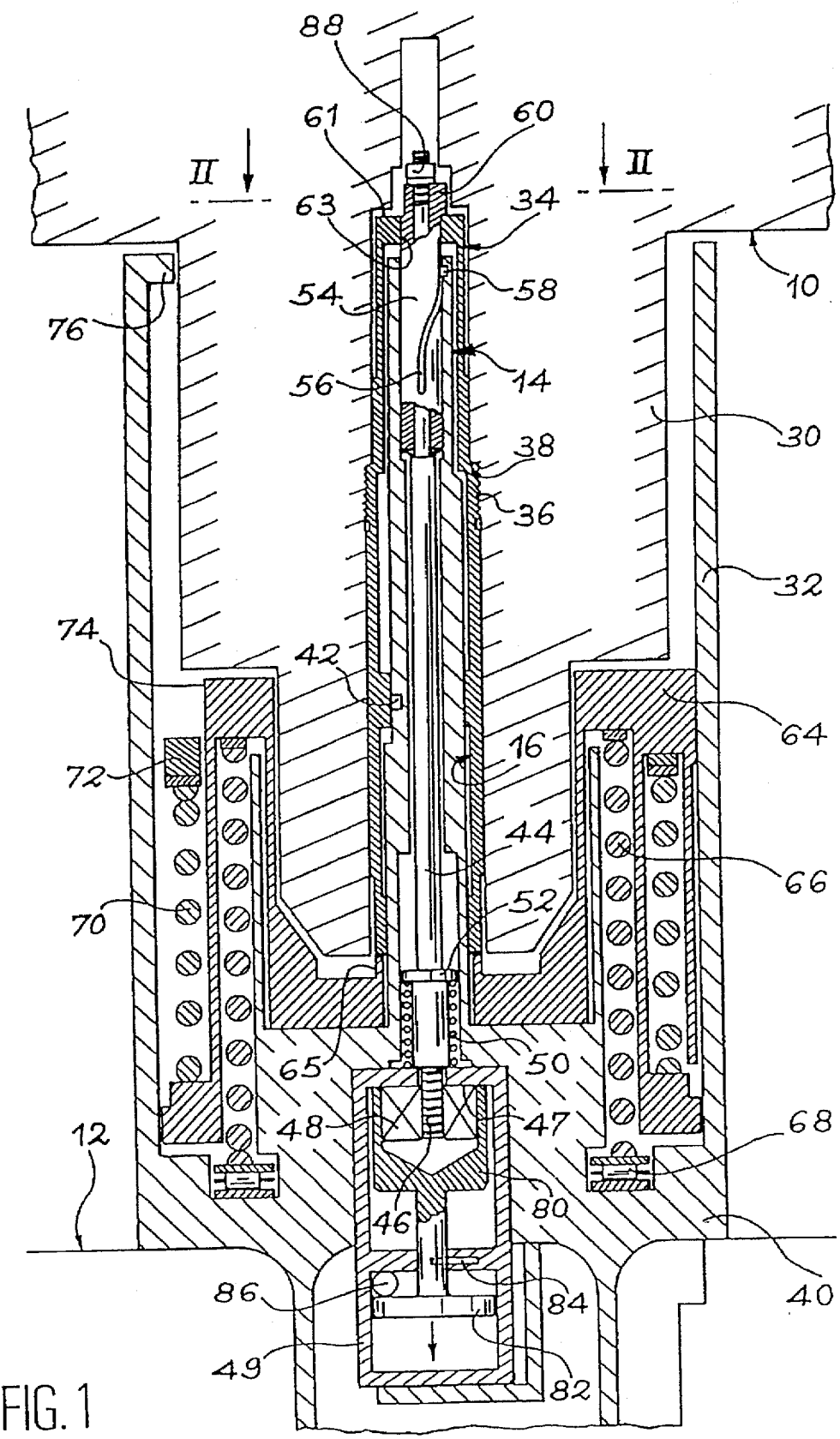
FIG. 1 is a longitudinal sectional view of an unlockable connecting device according to the invention.

FIG. 1 shows a unlockable connection device according to the invention associated with a spacing control device.

These two devices are interposed between an object 10 such as a satellite; or a probe and an object 12 constituted in this case by a spacecraft such as a launcher, a planetary probe, etc.

The object 10 has a tubular, projecting portion 30, which removably penetrates a tubular box or casing 32 joined to the spacecraft 12. The object 10 is connected to the latter by an unlockable connection device according to the present invention.

The projecting portion 30 of the object 10 is screwed onto a first member by a stepped guide tube 34 internally provided with a stepped bore 16. This arrangement makes it possible to rigidly fix the guide tube 34 to the object 10. More specifically, the guide tube 34 is fixed to the projecting portion 30 by screwing a thread 36 formed on the guide tube 34 into a complimentary tap formed in the projecting portion 30, until a shouldered portion of the guide tube 34 abuts against a shoulder 38 provided in the projecting portion 30.

The tubular box 32 is rigidly fixed to the spacecraft 12 by means of a support 40. In its central portion, said support 40 carries a guide mast 14 removably fitted inside the stepped bore 16. The guide mast 14 is coaxial to the tubular box 32 and oriented perpendicular to the support 40.

To produce a spin motion of the object 10 during its ejection, the stepped outer surface 20 of the guide mast 14 can be provided with a helical groove 42 forming a helical guidance means. A pin, not shown, projects radially into said helical groove 42 from the stepped bore 16 formed in the guide tube 34.

The object 10 is normally maintained in the position illustrated in FIG. 1, i.e. rigidly connected to the spacecraft 12 by an unlockable connection device according to the present invention. It should be noted that this unlockable connection device can be independent of the spacing control device or integrated into the spacing control device in the manner illustrated in FIG. 1.

The unlockable connecting device by which the object 10 is removably fixed to the spacecraft 12 has a second member comprising a connecting rod 44, which traverses the entire length of the guide mast 14. For this purpose the latter has a tubular configuration. The connecting rod 44 has a threaded portion 46 threaded in a segmented nut 48, which bears against an abutment surface 47 formed in a box 49 secured to the support 40. A weakly calibrated spring 50, located in the tubular guide mast 14, is interposed between the box 49 and a collar 52 formed on the connecting rod 44. This spring 50 tends to displace the connecting rod 44 along its longitudinal axis moving away from the spacecraft 12. The spring 50 is compressed between the collar 52 and the box 49 when the connecting rod 44 is screwed into the segmented nut 48, until a shoulder formed on the rod 44 bears against the box 49.

The segmented nut 48 is preferably encircled by a sleeve 80 fixed to a piston 82. The assembly formed by the sleeve 80 and the piston 82 is able to slide axially in the box 49 towards the bottom relative to FIG. 1. A brittle pin 84 normally maintains said assembly in the upper position illustrated in FIG. 1, in which the sleeve 80 encircles the segmented nut 48.

Unlocking initiating means, e.g. comprising a pyrotechnic system 86, is installed in the box 49. When unlocking initiating means is activated, a sudden pressure is formed in the chamber above the piston 82. The assembly formed by the piston 82 and the sleeve 80 then moves downwards after breaking the pin 84.

Figure 2:
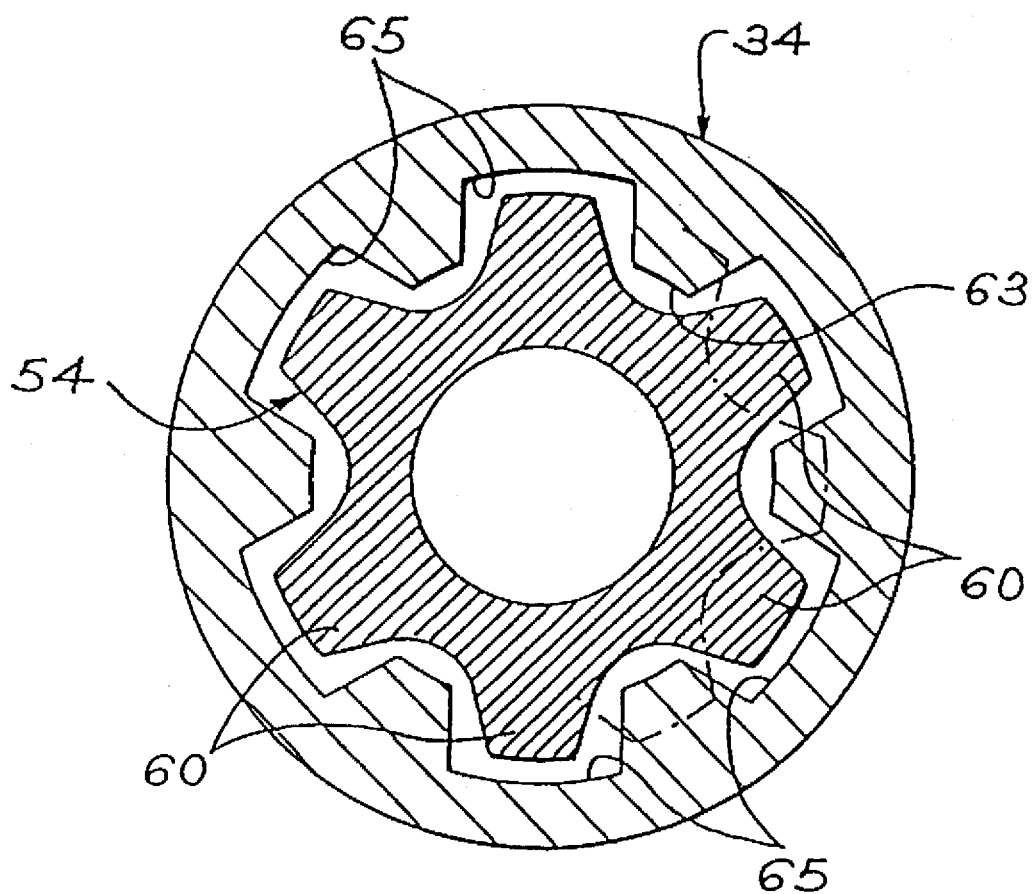
FIG. 2 is a sectional view along line II—II of FIG. 1.

At the other end of the connecting rod 44 is supported a ring 54. The ring 54 is able to rotate axially on the connecting rod 44 and is immobile in the radial direction. On its outer surface, the ring 54 has at least one helical groove 56 in which is received a pin 58 projecting radially inwards from the guide mast 14. The pin-groove assembly (58, 56) transforms the radial energy (i.e., radial energy produced by the unlocking initiating means) of the connecting rod 44 relative to the guide mast 14 into a rotation of the ring 54 around the connecting rod. The ring 54 projects through a window 63 (FIG. 2) formed in a terminal partition of the guide tube 34. Beyond said window 63, the ring 54 has one or more branches 60 oriented radially towards the outside. These branches 60 form a key against which normally bears a face 61, turned towards the object 10, of the terminal partition of the guide tube 34. This position corresponds to an angular position of the ring 54 defined by the retracted locking position of the connecting rod 44 in the guide mast 14 illustrated in FIG. 1.

Conversely, a rotation of the ring 54 caused by a displacement of the connecting rod 44 towards the end of the guide mast 14, i.e. towards a projecting unlocking position of said rod 44, brings the key formed by the radial branches 60 in front of complimentary notches 65 (FIG. 2) formed radially in the window 63. Therefore, the end of the ring 54 can then freely traverse the terminal partition of the guide tube 34. This position, illustrated in continuous line form in FIG. 2, corresponds to the unlocking of the connecting device, i.e., to separate the object 10 from the spacecraft 12 by a sliding of the guide tube 34 on the guide mast 14.

The passing of the connecting rod 44 from its retracted locking position into its projecting unlocking position is controlled by the spring 50, when the threaded end 46 of the connecting rod is released from the segmented nut 48.

The spacing control device associated with the unlockable connecting device in FIG. 1 also has ejection means. These ejection means make it possible to control the ejection of the object 10 with respect to the spacecraft 12 when the connecting device normally connecting these two members is unlocked. These ejection means are located between the support 40 and the end of the projecting portion 30 of the object 10 within the tubular box 32.

In the embodiment illustrated in FIG. 1, the ejection means comprise an ejector piston 64 sliding in the tubular box 32, so as to normally bear against the end face of the guide tube 34 rigidly secured to the object 10 when the connecting device is locked. This ejector piston 64 is an annular piston arranged coaxially around the guide mast 14 without having contact therewith. It has a central skirt 65 normally trapped between the support 40 and the adjacent end of the guide tube 34.

The ejection means also incorporate a helical compression spring 66, wherein one end bears on the support 50 by means of a roll abutment 68 and the opposite end bears on one face of the ejector piston 64 mined towards the said support 40.

In the preferred embodiment illustrated in FIG. 1, decelerating means are associated with the ejector piston 64, so that the velocity of the later is decelerated just before the complimentary cylindrical surfaces of the guide mast 14 and the stepped bore 16 simultaneously lose contact with one another, respectively, during the ejection of the object 10. As a result the hard, end of travel shock of the piston 64 only occurs when there is a radial clearance between the mast 14 and the object 10.

In FIG. 1, these decelerating means comprise a helical compression spring 70 which is placed around the ejector piston 64 and whose ends normally bear against two facing shoulders formed on said piston. More specifically, the end of the compression spring 70 nearest the object 10 bears on one of the aforementioned shoulders 10 by means of a ring 72.

One or more notches 74 (preferably three notches at 120° from one another to ensure a good bearing and prevent any asymmetry during the deceleration shock) are formed in that portion of the ejector piston 64 which is nearest the object 10, facing the ring 72. The tubular box 32 has the same number of arms 76 as the ejector piston 64 has notches 74. These arms 76 are positioned facing the notches 74, and bear against the ring 72 during the ejection of the object 10.

During installation, the connecting rod 44 is firstly screwed into the nut 48 by compressing the spring 50. The assembly, formed by the ejector piston 64, the guide tube 34 and the ring 54, is placed on the rod 44, which is maintained by screwing a nut 88 onto the threaded end of the connecting rod 44. The object 10 is then screwed onto the thread 36 of the guide tube 34.

As has been stated hereinbefore, the unlockable connecting device according to the invention can comprise ejection means different from those described hereinbefore, without departing from scope of the invention. As an example of such a variation, the guide mast 14, integral with the support 40, is eliminated and replaced by a mast integral with the ejector piston 64. The pin-groove assembly (58, 56) is then placed between the ring 54 and said mast.

As a result of the use of a key-equipped locking device separating the two objects by a rotary movement controlled by a spring, a controlled and shock-free separation is obtained. The initiating means (e.g., pyrotechnic means) do not act directly on this key-equipped device. This feature produces precise control of the attitude and velocity of the ejected object.

Accordingly, the present invention is intended to cover all such alternatives, modifications, and equivalents as may be included within the spirit and broad scope of the invention as defined only by the hereafter appended claims.

We claim:

1. An unlockable connection device to connect a first object and a second object, comprising:

a tube member secured to the first object;

a rod member having a longitudinal axis;

an unlockable blocking means adapted to immobilize a first end of the rod member with respect to the second object;

unlocking initiating means adapted to control unlocking of the blocking means;

resilient means adapted to move the rod member in a direction along its longitudinal axis, away from the second object, upon unlocking of the blocking means;

a rotary key system carried by a second end of the rod member and engaging an end wall of the tube member; and means for controlling a rotation of said key system about the longitudinal axis of the rod member, when the rod member moves in said direction, thereby to free the key system from said end wall whereby the attitude and velocity of the second object are controlled upon release from the first object.

2. An unlockable connection device to connect a first object and a second object, comprising:

a tube member secured to the first object;

a rod member having a longitudinal axis;

an unlockable blocking means adapted to immobilize a first end of the rod member with respect to the second object;

unlocking initiating means adapted to control unlocking of the blocking means;

control means, adapted to displace the rod member in a direction along its longitudinal axis, away from the second object, upon unlocking of the blocking means;

a rotary ring adapted to rotate on a second end of the rod member, about said longitudinal axis, said ring comprising a key system engaging an end wall of said tube member; and means for controlling rotation of said rotary ring about said longitudinal axis, when the rod member moves in said direction, thereby to unlock the key system from the end wall whereby the attitude and velocity of the second object are controlled upon release from the first object.

3. An unlockable connection device to connect a first object and a second object comprising:

a tube member secured to the first object;

a rod member having a longitudinal axis;

an unlockable blocking means adapted to immobilize a first end of the rod member with respect to the second object;

unlocking initiating means adapted to control unlocking of the blocking means;

key means interconnecting said tube member and a second end of the rod member; and means for controlling a release of said key means, upon unlocking of the blocking means whereby the attitude and velocity of the second object are controlled upon release from the first object.

4. An unlockable connection device to connect a first object and a second object, comprising:

a first member secured to the first object;

a second member having a longitudinal axis;

an unlockable blocking means adapted to immobilize a first end of the second member with respect to the second object;

unlocking initiating means adapted to control unlocking of the blocking means;

key means interconnecting said first member and a second end of the second member; and means for controlling a release of said key means, upon unlocking of the blocking means whereby the attitude and velocity of the second object are controlled upon release from the first object.

5. An unlockable connection device to connect a first object and a second object, comprising:

a tube member secured to the first object;

a tubular mast secured to the second object and received in said tube member;

a rod member traversing the entire length of a guide mast, and having a longitudinal axis;

an unlockable blocking means adapted to immobilize a first end of the rod member with respect to the second object;

unlocking initiating means adapted to control unlocking of the blocking means;

a rotary ring adapted to rotate on a second end of the rod member, about said longitudinal axis, said ring comprising at least one key engaging an end wall of said tube member; and control means located between the tubular mast and the ring, for controlling rotation of the ring upon a movement of the rod member.

6. An unlockable connection device for use between two objects, comprising:

a first member fixed to a first of said objects; a second member connected with the second object; unlockable coupling means to engage said first and second members, said unlockable coupling means comprises a rotary key system; said second object having an unlocking initiating means and an unlockable blocking means to immobilize the second member with respect to the second object, wherein unlocking of said first and second members is controlled by the unlocking initiating means and by a displacement of the second member in a given direction with respect to the second object;

wherein the second member further comprises a rod, said rod having one end fixed to the second object by the unlockable blocking means, and said direction being oriented with an axis of the rod extending away from the second object;

wherein said rod comprises a rotary ring carrying at least one key in engagement against one face of the first member in a first angular position of the ring relative to the first member, said key being able to traverse a notch formed in said face in a second angular position of the ring with respect to the first member, and means for controlling a rotation of the ring from the first to the second angular position when the rod moves in said direction; and wherein the means for controlling a rotation of the ring comprises at least one pin-groove assembly placed between the ring and a part linked with the second object.

7. A device according to claim 6, wherein said part is fixed to the second object and supports said unlocking initiating means.

8. A device according to claim 6, wherein said part is an annular ejector piston displaceable in said direction relative to said second object.

9. A device according to claim 6, wherein said second member further comprises an elastic means to displace the second member in said given direction.

10. An unlockable connection device for use between two objects, comprising:

a first member fixed to a first of said objects, a second member connected with the second object, unlockable coupling means to engage said first and second members, said unlockable coupling means comprises a rotary key system, said second object having an unlocking initiating means and an unlockable blocking means to immobilize the second member with respect to the second object, wherein unlocking of said first and second members is controlled by the unlocking initiating means and by a displacement of the second member in a given direction with respect to the second object;

wherein the second member further comprises a rod, said rod having one end fixed to the second object by the unlockable blocking means, and said direction being oriented with an axis of the rod extending away from the second object;

wherein said rod comprises a rotary ring carrying at least one key comprised in said rotary key system in engagement against one face of the first member in a first angular position of the ring relative to the first member, said key being able to traverse a notch formed in said face in a second angular position of the ring with respect to the first member, and means for controlling a rotation of the ring from the first to the second angular position when the rod moves in said direction;

wherein the means for controlling a rotation of the ring comprises at least one pin-groove assembly placed between the ring and a part linked with the second object; and wherein the unlockable blocking means further comprises a segmented nut engaged on a threaded portion of the second member and bearing against an abutment surface formed in the second object, and a sleeve disposed about said segmented nut, said sleeve being axially displaced with respect to the segmented nut during an actuation of the unlockable blocking means of the unlocking initiating means.

* * * * *